(12) United States Patent
Jiao et al.

(10) Patent No.: US 12,187,952 B2
(45) Date of Patent: Jan. 7, 2025

(54) COOLANT AND METHOD FOR PREPARING THEREOF

(71) Applicant: Zhuocong (Shanghai) Environmental Protection Technology Development Co., LTD., Shanghai (CN)

(72) Inventors: Haijun Jiao, Shanghai (CN); Junhua Xu, Shanghai (CN); Zhipeng Zhu, Shanghai (CN)

(73) Assignee: ZHUOCONG (SHANGHAI) ENVIRONMENTAL PROTECTION TECHNOLOGY DEVELOPMENT CO., LTD., Shanghai (CN)

( * ) Notice: Subject to any disclaimer, the term of this patent is extended or adjusted under 35 U.S.C. 154(b) by 1087 days.

(21) Appl. No.: 16/961,692

(22) PCT Filed: Jul. 10, 2018

(86) PCT No.: PCT/CN2018/095114
§ 371 (c)(1),
(2) Date: Jul. 12, 2020

(87) PCT Pub. No.: WO2019/140871
PCT Pub. Date: Jul. 25, 2019

(65) Prior Publication Data
US 2021/0079281 A1 Mar. 18, 2021

(30) Foreign Application Priority Data
Jan. 22, 2018 (CN) .......................... 201810057912.0

(51) Int. Cl.
| C09K 5/10 | (2006.01) |
| H01M 10/0525 | (2010.01) |
| H01M 10/613 | (2014.01) |
| H01M 10/6567 | (2014.01) |

(52) U.S. Cl.
CPC ........... *C09K 5/10* (2013.01); *H01M 10/0525* (2013.01); *H01M 10/613* (2015.04); *H01M 10/6567* (2015.04)

(58) Field of Classification Search
CPC .......... C09K 5/04; C09K 5/041; C09K 5/044; C09K 5/045; C09K 5/048; C09K 5/10; H01B 3/20; H01B 3/22; H01B 3/24; H01M 10/613; H01M 10/6567; H01M 10/0525
See application file for complete search history.

(56) References Cited

U.S. PATENT DOCUMENTS

| 5,087,383 | A | * | 2/1992 | Robeck | C11D 7/5063 |
| | | | | | 510/506 |
| 5,098,595 | A | * | 3/1992 | Merchant | C11D 7/5063 |
| | | | | | 252/364 |
| 5,182,040 | A | * | 1/1993 | Bartlett | C09K 5/045 |
| | | | | | 252/364 |
| 5,827,446 | A | * | 10/1998 | Merchant | C09K 5/045 |
| | | | | | 516/8 |
| 5,827,812 | A | * | 10/1998 | Flynn | C23G 5/02806 |
| | | | | | 106/311 |
| 5,851,436 | A | * | 12/1998 | Merchant | C11D 7/5072 |
| | | | | | 510/412 |
| 6,337,033 | B2 | * | 1/2002 | Basile | C09K 5/045 |
| | | | | | 252/68 |
| 6,432,320 | B1 | * | 8/2002 | Bonsignore | B82Y 30/00 |
| | | | | | 165/104.19 |
| 6,699,829 | B2 | * | 3/2004 | Doyel | C11D 7/5018 |
| | | | | | 510/202 |
| 7,163,645 | B2 | * | 1/2007 | Hanada | C11D 7/261 |
| | | | | | 510/415 |
| 7,629,307 | B2 | * | 12/2009 | Owens | C23G 5/02806 |
| | | | | | 134/40 |
| 7,695,636 | B2 | * | 4/2010 | Fukushima | C09K 5/045 |
| | | | | | 252/73 |
| 7,943,055 | B2 | * | 5/2011 | Fukushima | C09K 5/10 |
| | | | | | 252/67 |
| 9,816,057 | B2 | * | 11/2017 | Shellef | C11D 7/5018 |
| 2008/0157023 | A1 | * | 7/2008 | Samuels | C10M 171/008 |
| | | | | | 252/68 |
| 2010/0187469 | A1 | * | 7/2010 | Srinivasan | C09K 5/10 |
| | | | | | 252/78.1 |
| 2015/0096312 | A1 | * | 4/2015 | Rached | C09K 5/045 |
| | | | | | 252/68 |
| 2015/0184049 | A1 | | 7/2015 | Nishiguchi et al. | |
| 2016/0244653 | A1 | * | 8/2016 | Singh | F25D 13/00 |
| 2017/0346134 | A1 | | 11/2017 | Bandhauer | |

FOREIGN PATENT DOCUMENTS

| CN | 101400756 A | 4/2009 | |
| CN | 101809114 A | 8/2010 | |
| CN | 101970597 A | 2/2011 | |
| CN | 102181270 A | 9/2011 | |
| CN | 102482181 A | 5/2012 | |
| CN | 106816564 A | 6/2017 | |
| CN | 107502479 A * | 12/2017 | ............ C11D 7/261 |
| EP | 2876153 A1 * | 5/2015 | ............ B01D 12/00 |
| EP | 2970835 | 1/2016 | |
| JP | 10324652 A * | 12/1998 | |
| JP | 10324897 A * | 12/1998 | |
| JP | 2000-7602 A | 1/2000 | |

(Continued)

*Primary Examiner* — Matthew R Diaz
(74) *Attorney, Agent, or Firm* — Cheng-Ju Chiang

(57) ABSTRACT

The present invention discloses an immersion type heat dissipation cooling liquid for power lithium battery and a method for preparing thereof. It is composed of 30 parts to 70 parts of hydrofluoroether compound, 30 parts to 50 parts of halogenated hydrocarbon, 1 part to 10 parts of alcohol compound, 0.01 parts to 0.5 parts of antioxidant, 0.01 parts to 0.5 parts of preservative, and 0.01 parts to 0.5 parts of nano metal oxide. The present invention mainly includes the hydrofluoroether compound, which is mixed with the halogenated hydrocarbon, the alcohol and other compounds to form an azeotrope, and is supplemented with antioxidant, preservative and non-conductive nano metal oxide additive to form a cooling liquid composition. The present invention can quickly realize the heat transfer effect, effectively solve the problem of heat generation and heat dissipation of the power lithium battery.

12 Claims, No Drawings

(56) References Cited

FOREIGN PATENT DOCUMENTS

| | | | |
|---|---|---|---|
| JP | 2004075910 A * | 3/2004 | |
| JP | 6019759 B2 | 11/2016 | |
| TW | 200509453 A | 3/2005 | |
| TW | 200511638 A | 3/2005 | |
| TW | 201323602 A1 | 6/2013 | |
| WO | WO-2005007771 A1 * | 1/2005 | ............... C09K 5/10 |
| WO | 2014/096417 A1 | 6/2014 | |
| WO | WO-2018125738 A1 * | 7/2018 | ............ C11D 7/245 |

* cited by examiner

COOLANT AND METHOD FOR PREPARING THEREOF

The present application is based on and claims the priority of Chinese patent application No. 201810057912.0, filed on Jan. 22, 2018, submitted by Shanghai Chenhai Technology Group Co., Ltd., entitled "IMMERSION TYPE HEAT DISSIPATION COOLING LIQUID FOR POWER LITHIUM BATTERY AND METHOD FOR PREPARING THEREOF". The entire disclosure of the above-identified application is incorporated herein by reference.

TECHNICAL FIELD

The present invention relates to chemical field, in particular to an immersion type heat dissipation cooling liquid for power lithium battery and a method for preparing thereof.

BACKGROUND

With the rapid developments of new energy vehicles, power lithium batteries are widely used, but they also face a series of problems that need to be solved urgently, such as the decrease of battery life, the reduction of reliability and safety, which are caused by the heat generation of the battery. Heat dissipation technology of the power lithium battery mainly includes indirect heat dissipation and cooling technology and direct cooling technology. Existing power lithium battery mainly use indirect heat dissipation modes such as natural cooling, air cooling, and pipeline liquid cooling. Such heat dissipation technology can alleviate the heat dissipation problem of the battery in a certain extent, but it is not sufficient to meet the heat dissipation requirements of high heat flux power lithium battery packs. Its shortcomings are obvious, the heat transfer process is complicated, and there are contact thermal resistance and convection heat resistance, which cause a large total heat resistance, and a low heat transfer efficiency. Meanwhile, it may cause the internal heat to superimpose, and accordingly cause the temperature in the battery pack to be higher and higher, which ultimately affects the service life and the safety of the battery pack. In addition, some power lithium batteries, such as power lithium batteries for electric vehicles, have a harsh operation environment and high frequency of use, which have stricter requirements for power lithium battery packs and require a uniform temperature field within the battery pack. This causes indirect heat dissipation and cooling technologies could not meet the heat dissipation requirements. The direct cooling technology mainly uses immersion cooling technology, that is, the entire battery pack is completely immersed in the cooling medium. According to the difference of the boiling points of the cooling medium, it is divided into phase change immersion cooling and single-phase immersion cooling. Phase change immersion cooling is achieved by evaporating the cooling medium at the heat generation area of the battery pack into a gaseous state and rising to a top of an enclosed space, exchanging heat with a heat exchanger at the top to be re-cooled to liquid and complete the cycle; single-phase immersion cooling completes the circulation by a medium pump to achieve the heat exchange. Due to its large specific heat of cooling medium and fast heat dissipation, the cooling efficiency of immersion type direct cooling is much higher than indirect heat dissipation and cooling technology. In immersion type cooling technology, phase change cooling uses vaporization latent heat to take away heat when the cooling liquid is boiling. Due to the latent heat of vaporization is much greater than the specific heat of the cooling medium, the cooling effect of evaporative cooling is more significant.

Technical Problem

At present, the cooling liquid used for immersion cooling of power lithium battery mainly includes mineral oil, silicone oil, natural ester oil, synthetic ester oil, etc., and their boiling points are relatively high. Their principle of heat dissipation is single-phase immersion cooling, and the heat dissipation effect is poor relative to phase change cooling. Therefore, it is an important task to explore a new type of phase change immersion type heat dissipation cooling liquid for dissipating heat of the power lithium battery.

Technical Solution

In view of this, the present invention provides an immersion type heat dissipation cooling liquid for power lithium battery and a method for preparing thereof, which has good heat dissipation effect, high specific heat, low expansion, low toxicity, high insulation, flame retardancy, inertness, strong material compatibility, and etc., and can quickly achieve heat transfer effect, effectively solve the problem of heat generation and heat dissipation of the power lithium battery, improve battery life, reduce the risk of failure, and enhance the safety of the battery.

The immersion type heat dissipation cooling liquid for power lithium battery provided by the present invention includes the following components in weight ratios: 30 parts to 70 parts of hydrofluoroether compound, 30 parts to 50 parts of halogenated hydrocarbon, and 1 part to 10 parts of alcohol compound, 0.01 parts to 0.5 parts of antioxidant, 0.01 parts to 0.5 parts of preservative, and 0.01 parts to 0.5 parts of nano metal oxide.

Preferably, the hydrofluoroether compound, the halogenated hydrocarbon and the alcohol compound are mixed to form a hydrofluoroether azeotrope, the hydrofluoroether azeotrope has high specific heat, low expansion, low toxicity, high insulation, flame retardancy, inertness, strong material compatibility, and etc., and can quickly achieve the heat transfer effect, effectively solve the problem of heat generation and heat dissipation of the power lithium battery, improve the battery life, reduce the risk of failure, and enhance the safety of the battery.

Preferably, the hydrofluoroether compound is selected from a group consisting of 1,1,2,2-tetrafluoroethyl-2,2,2-trifluoroethyl ether, 1,1,2,2-tetrafluoroethyl ethyl ether, 1,1,1,2,3,3-hexafluoro-3-methoxypropane and methyl nonafluorobutyl ether.

Preferably, the halogenated hydrocarbon is selected from a group consisting of 1,1-dichloroethane and 1,2-dichloroethylene.

Preferably, the alcohol compound is selected from a group consisting of methanol and ethanol.

Preferably, the antioxidant is a bisphenol compound.

Preferably, the antioxidant is phenol.

Preferably, the preservative is an imidazole compound, which can prevent the corrosion and oxidation of the metal materials in the battery components.

Preferably, the preservative is benzotriazole.

Preferably, the nano metal oxide is at least one of nano titanium dioxide, aluminum oxide, and zinc oxide, which are dispersed in the cooling liquid, to increase the specific heat capacity of the cooling liquid, increase the chance of collision between particles, improve the thermal conductivity, enhance the liquid turbulent effects, improve heat distribution performance, reduce thermal gradients and eliminate thermal polarization.

The method for preparing the immersion type heat dissipation cooling liquid for power lithium battery provided by the present invention includes the following steps:

Adding a certain amount of hydrofluoroether compound into a reactor equipped with a stirring device and maintaining in room temperature;

Turning on the stirring device and adding an appropriate proportion of halogenated hydrocarbon and alcohol compound while stirring, to form a hydrofluoroether azeotrope;

Adding an antioxidant and a preservative into the hydrofluoroether azeotrope in sequence, and stirring well;

Adding a nano metal oxide additive and stirring it evenly to prepare the immersion type heat dissipation cooling liquid for the power lithium battery;

Loading the prepared immersion type heat dissipation cooling liquid for the power lithium battery into a plastic bucket, and storing it in a sealed state.

Preferably, in the step of adding a certain amount of hydrofluoroether compound into the reactor equipped with the stirring device, and maintaining in the room temperature, the room temperature is about 25° C.

Preferably, in the step of turning on the stirring device and adding the appropriate proportion of the halogenated hydrocarbon and the alcohol compounds while stirring, to form a hydrofluoroether azeotrope, the hydrofluoroether azeotrope is stirred for about 15 minutes after the halogenated hydrocarbon and the alcohol compounds are added.

Preferably, in the step of adding the antioxidant and the preservative into the hydrofluoroether azeotrope in sequence, and stirring well, the stirring time is about 15 minutes.

Preferably, in the step of adding the nano metal oxide additive and stirring it evenly to prepare the immersion type heat dissipation cooling liquid for the power lithium battery, after the nano metal oxide additive is added, it is stirred at a high speed of 2000 rpm for 30 minutes.

The present invention is mainly composed of the hydrofluoroether compound, which is mixed with the halogenated hydrocarbon, the alcohol and other compounds to form an azeotrope, and is supplemented with the antioxidant, the preservative and the non-conductive nano metal oxide additive to form a cooling liquid composition.

Advantageous Effects

The present invention has the following beneficial effects:
1. The boiling point of the hydrofluoroether compound used in the present invention is 50° C. to 60° C., and the boiling point of the azeotrope formed by mixing with the halogenated hydrocarbon, the alcohol, and the like is 40° C. to 60° C. The heat dissipation of the immersion type heat dissipation cooling liquid for the power lithium battery is phase change heat dissipation, and the heat dissipation efficiency is high, so that the battery pack can be used in an extreme environment while maintaining a temperature most suitable for battery operation.
2. The material of the cooling liquid of the present invention has a strong compatibility, and will not generate a chemical reaction between the battery cell, the casing, and the components and materials immersed in the cooling liquid.
3. In the present invention, the non-conductive nano metal oxide is added as an additive and dispersed in the cooling liquid, which improves the specific surface and specific heat capacity of the cooling liquid, increases the chance of collision between the particles, improves thermal conductivity, enhances the effect of liquid turbulence and thermal distribution performance, reduces thermal gradients and eliminates thermal polarization.
4. The cooling liquid for the present invention has the characteristics of high specific heat, low expansion, low toxicity, high insulation, flame retardancy, inertness, and strong material compatibility.

DETAILED DESCRIPTION OF PREFERRED EMBODIMENTS

In order to further illustrate the technical means and effects to achieve the intended purpose of the present invention, accompanying with the drawings and preferred embodiments, the following describes the specific implementation, structure, feature and function of the present invention in detail.

The specific embodiment adopts the following technical solution: an immersion type heat dissipation cooling liquid for power lithium battery is composed of the following components in weight ratios: 30 parts to 70 parts of hydrofluoroether compound, 30 parts to 50 parts of halogenated hydrocarbon, 1 part to 10 parts of alcohol compound, 0.01 parts to 0.5 parts of antioxidant, 0.01 parts to 0.5 parts of preservative, 0.01 parts to 0.5 parts of nano metal oxide. When preparing the immersion type heat dissipation cooling liquid for the power lithium battery of this embodiment, the component may be weighed by gram or kilogram, as long as the mass unit of each component is the same.

In the above formula, the hydrofluoroether compound, the halogenated hydrocarbon and the alcohol compound are mixed to form a hydrofluoroether azeotrope. In this embodiment, the boiling point of the hydrofluoroether compound is 50° C. to 60° C., the boiling point of the formed hydrofluoroether azeotrope is 40° C. to 60° C., and the formed hydrofluoroether azeotrope has high specific heat, low expansion, low toxicity, high insulation, flame retardancy, inertness, strong material compatibility and the like, and can quickly achieve heat transfer effect, effectively solve the problem of heat generation and heat dissipation of the power lithium battery, improve the battery life, reduce the risk of failure, and enhance the safety of the battery. The antioxidant is a bisphenol compound.

Specifically, the hydrofluoroether compound may be 1,1,2,2-tetrafluoroethyl-2,2,2-trifluoroethyl ether (HFE-347), 1,1,2,2-tetrafluoroethyl ethyl ether, 1,1,1,2,3,3-hexafluoro-3-methoxypropane (HFE-356mec), methyl nonafluorobutyl ether (HFE-7100), and the like. The halogenated hydrocarbon may be 1,1-dichloroethane, 1,2-dichloroethylene and the like. The alcohol compound may be methanol, ethanol and the like. The antioxidant may be a bisphenol compound, such as phenol. The preservative may be an imidazole compound, or a benzotriazole, which is used to prevent the corrosion and oxidation of the metal materials in the battery components. The nano metal oxides are non-conductive nano metal oxides, such as at least one of nano titanium dioxide, aluminum oxide, and zinc oxide, which are dispersed in the cooling liquid, to increase the specific heat capacity of the cooling liquid, increase the chance of collision between particles, improve thermal conductivity, enhance liquid turbulence effects, improve heat distribution performance, reduce thermal gradients and eliminate thermal polarization.

The method for preparing the immersion type heat dissipation cooling liquid for the power lithium battery of this specific embodiment includes:
1. Adding a certain amount of hydrofluoroether compound into a reactor equipped with a stirring device, keeping the room temperature around 25° C.;
2. Turning on the stirring device, adding an appropriate proportion of halogenated hydrocarbon and alcohol compound while stirring, and stirring for about 15 minutes to form a hydrofluoroether azeotrope;
3. After the hydrofluoroether azeotrope is prepared in step 2, sequentially adding the antioxidant and the preservative, and stirring for about 15 minutes respectively;
4. Adding the nano metal oxide additive to the liquid prepared in step 3, stirring at a high speed of 2000 rpm for 30 minutes to obtain the immersion type heat dissipation cooling liquid for the power lithium battery;
5. Loading the prepared immersion type heat dissipation cooling liquid for the power lithium battery prepared in step 4 into a plastic bucket, and storing it in a sealed state.

In addition to meeting the performance requirements of high specific heat, low expansion, low toxicity, high insulation, flame retardancy, and etc., the cooling liquid composition of this embodiment also has the characteristics of inertness, strong material compatibility, and etc, so that the battery cell, the casing, and the components and materials immersed in the cooling liquid could not generate a chemical reaction, which can directly and effectively solve the heat generation problem of the power lithium battery.

Example 1

An immersion type heat dissipation cooling liquid for power lithium battery is composed of the following components in weight ratios: 55 parts of 1,1,2,2-tetrafluoroethyl-2,2,2-trifluoroethane ether (HFE-347); 42 parts of 1,1-dichloroethane; 2 parts of methanol; 0.05 parts of phenol; 0.1 parts of benzotriazole; 0.02 parts of nano titanium dioxide; 0.03 parts of nano alumina.

The method for preparing the immersion type heat dissipation cooling liquid for power lithium battery described above is as follows:
1. Adding 55 parts of 1,1,2,2-tetrafluoroethyl-2,2,2-trifluoroethyl ether (HFE-347) to a reactor equipped with a stirring device, keeping the room temperature around 25° C.
2. Turning on the stirring device, adding 42 parts of 1,1-dichloroethane and 2 parts of methanol while stirring, and stirring for about 15 minutes to form a hydrofluoroether azeotrope.
3. After the hydrofluoroether azeotrope is prepared in step 2, sequentially adding 0.05 parts of phenol and 0.1 part of benzotriazole, and stirring the mixture for about 15 minutes, respectively.
4. Adding 0.02 parts of nano-titanium dioxide and 0.03 parts of nano-alumina into the liquid prepared in step 3, stirring at a high speed of 2,000 rpm for 30 minutes to prepare the immersion type heat dissipation cooling liquid for the power lithium battery.
5. Loading the heat dissipation cooling liquid for the power lithium battery prepared in step 4 into a plastic bucket, and storing it in a sealed state.

Example 2

An immersion type heat dissipation cooling liquid for power lithium battery is composed of the following components in weight ratios: 65 parts of 1,1,2,2-tetrafluoroethyl ethyl ether; 32 parts of 1,1-dichloroethane; 2.5 parts of methanol; 0.05 parts of phenol; 0.1 parts of benzotriazole; 0.2 parts of nano zinc oxide; 0.15 parts of nano alumina.

The method for preparing the immersion type heat dissipation cooling liquid for the power lithium battery described above is as follows:
1. Adding 65 parts of 1,1,2,2-tetrafluoroethyl ethyl ether to a reactor equipped with a stirring device and keeping the room temperature around 25° C.
2. Turning on the stirring device, adding 32 parts of 1,1-dichloroethane and 2.5 parts of methanol respectively while stirring, and stirring for about 15 minutes to form a hydrofluoroether azeotrope.
3. After the hydrofluoroether azeotrope is prepared in step 2, sequentially adding 0.05 parts of phenol and 0.1 parts of benzotriazole and stirring for about 15 minutes, respectively.
4. Adding 0.2 parts of nano zinc oxide and 0.15 parts of nano alumina to the liquid prepared in step 3, and stirring at a high speed of 2000 rpm for 30 minutes to obtain the immersion type heat dissipation cooling liquid for the power lithium battery.
5. Loading the immersion type heat dissipation cooling liquid for the power lithium battery prepared in step 4 into a plastic bucket, and storing it in a sealed state.

Example 3

An immersion type heat dissipation cooling liquid for power lithium battery is composed of the following components in weight ratios: 75 parts of 1,1,1,2,3,3-hexafluoro-3-methoxypropane (HFE-356mec); 22 parts of 1,1-dichloroethane; 2.8 parts of methanol; 0.05 parts of phenol; 0.1 parts of benzotriazole; 0.02 parts of nano titanium dioxide; 0.03 parts of nano alumina.

The method for preparing the immersion type heat dissipation cooling liquid for the power lithium battery described above is as follows:
1. Adding 75 parts of 1,1,1,2,3,3-hexafluoro-3-methoxypropane (HFE-356mec) to a reactor equipped with a stirring device and keeping the room temperature around 25° C.
2. Turning on the stirring device, adding 22 parts of 1,1-dichloroethane and 2.8 parts of methanol respectively while stirring, and stirring for about 15 minutes to form a hydrofluoroether azeotrope.
3. After the hydrofluoroether azeotrope is prepared in step 2, sequentially adding 0.05 parts of phenol and 0.1 parts of benzotriazole and stirring for about 15 minutes, respectively.
4. Adding 0.02 parts of nano titanium dioxide and 0.03 parts of nano alumina to the liquid prepared in step 3, and stirring at a high speed of 2000 rpm for 30 minutes to obtain the immersion type heat dissipation cooling liquid for the power lithium battery.
5. Loading the immersion type heat dissipation cooling liquid for the power lithium battery prepared in step 4 into a plastic bucket, and storing it in a sealed state.

Embodiment 4

An immersion type heat dissipating cooling liquid for power lithium battery is composed of the following components in weight ratios: 53 parts of methyl nonafluorobutane (HFE-7100); 45 parts of 1,2-dichloroethylene; 2 parts of ethanol; 0.05 parts of phenol; 0.1 parts of benzotriazole; 0.02 parts of nano titanium dioxide; 0.03 parts of nano alumina.

The method for preparing the immersion type heat dissipation cooling liquid for the power lithium battery described above is as follows:

1. Adding 53 parts of methyl nonafluorobutyl ether (HFE-7100) to a reactor equipped with a stirring device and keeping the room temperature around 25° C.
2. Turning on the stirring device, adding 45 parts of 1,2-dichloroethylene and 2 parts of ethanol while stirring, and stirring for about 15 minutes to form a hydrofluoroether azeotrope.
3. After the hydrofluoroether azeotrope is prepared in step 2, sequentially adding 0.05 parts of phenol and 0.1 parts of benzotriazole, and stirring for about 15 minutes, respectively.
4. Adding 0.02 parts of nano titanium dioxide and 0.03 parts of nano alumina to the liquid prepared in step 3, and stirring at a high speed of 2,000 rpm for 30 minutes to obtain the immersion type heat dissipation cooling liquid for the power lithium battery.
5. Loading the immersion type heat dissipation cooling liquid for the power lithium battery prepared in step 4 into a plastic bucket, and storing it in a sealed state.

Example 5

An immersion type heat dissipation cooling liquid for power lithium battery is composed of the following components in weight ratios: 55 parts of 1,1,2,2-tetrafluoroethyl-2,2,2-trifluoroethane ether (HFE-347); 42 parts of 1,1-dichloroethane; 2 parts of methanol; 0.05 parts of phenol; 0.1 parts of benzotriazole; 0.02 parts of nano titanium dioxide; 0.03 parts of nano alumina; 0.05 parts of nano zinc oxide.

The method for preparing the immersion type heat dissipation cooling liquid for a power lithium battery described above is as follows:

1. Adding 55 parts of 1,1,2,2-tetrafluoroethyl-2,2,2-trifluoroethyl ether (HFE-347) to a reactor equipped with a stirring device, keeping the room temperature around 25° C.
2. Turning on the stirring device, adding 42 parts of 1,1-dichloroethane and 2 parts of methanol respectively while stirring, stirring for about 15 minutes to form a hydrofluoroether azeotrope.
3. After the hydrofluoroether azeotrope is prepared in step 2, sequentially adding 0.05 parts of phenol and 0.1 parts of benzotriazole, and stirring for about 15 minutes, respectively.
4. Adding 0.02 parts of nano titanium dioxide, 0.03 parts of nano alumina and 0.05 parts of nano zinc oxide to the liquid prepared in step 3, and stirring at a high speed of 2000 rpm for 30 minutes to prepare the immersion type heat dissipation cooling fluid for the power lithium battery.
5. Loading the immersion type heat dissipation cooling liquid for the power lithium battery prepared in step 4 into a plastic bucket, and storing it in a sealed state.

In this context, the terms "including", "comprising" or any other variant thereof are intended to cover non-exclusive inclusions, in addition to those listed elements, other elements not explicitly listed are also included.

In the case of no conflict, the above embodiments and the features in the embodiments herein can be combined with each other.

The above are only preferred embodiments of the present invention and are not intended to limit the present invention. Any modification, equivalent replacement, improvement, and the like made within the spirit and principle of the present invention should be included within the protection scope of the present invention.

INDUSTRIAL APPLICABILITY

1. The hydrofluoroether compound used in the present invention has a boiling point of 50° C. to 60° C., and the boiling point of the azeotrope formed by mixing with the halogenated hydrocarbon, the alcohol, and the like is 40° C. to 60° C. For the immersion type heat dissipation cooling liquid used in the power lithium battery packs, the heat dissipation is phase change heat dissipation, and the heat dissipation efficiency is high, so that the battery pack can be used in an extreme environment while maintaining a temperature that is most suitable for battery operation.

2. The cooling liquid material of the present invention has strong compatibility, and no chemical reaction will occur in the battery cell, the casing, and the components and materials immersed in the cooling liquid.

3. The non-conductive nano metal oxide used in the present invention is added as an additive and dispersed in the cooling liquid, which improves the specific surface and specific heat capacity of the cooling liquid, increases the chance of collision between particles, improves thermal conductivity, enhances the effect of liquid turbulence, and improves thermal distribution performance, reduces thermal gradients and eliminates thermal polarization.

4. The cooling liquid of the present invention has the characteristics of high specific heat, low expansion, low toxicity, high insulation, flame retardancy, inertness, strong material compatibility, and etc.

What is claimed is:

1. A coolant, comprising the following components:
   30 parts to 70 parts of a hydrofluoroether compound, 30 parts to 50 parts of a halogenated hydrocarbon, 1 part to 10 parts of an alcohol compound, 0.01 parts to 0.5 parts of an antioxidant, 0.01 parts to 0.5 parts of a preservative, and 0.01 parts to 0.5 parts of a nano metal oxide;
   wherein the hydrofluoroether compound is 1,1,2,2-tetrafluoroethyl-2,2,2-trifluoroethyl ether, the halogenated hydrocarbon is selected from a group consisting of 1,1-dichloroethane and 1,2-dichloroethylene, the alcohol compound is selected from a group consisting of methanol and ethanol.

2. The coolant of claim 1, wherein the coolant comprises a hydrofluoroether azeotrope which is composed by the hydrofluoroether compound, the halogenated hydrocarbon and the alcohol compound.

3. The coolant of claim 1, wherein the antioxidant is a bisphenol compound.

4. The coolant of claim 1, wherein the antioxidant is phenol.

5. The coolant of claim 1, wherein the preservative is an imidazole compound.

6. The coolant of claim 1, wherein the preservative is benzotriazole.

7. The coolant of claim 1, wherein the nano metal oxide is at least one of nano titanium dioxide, aluminum oxide, and zinc oxide.

8. A method for preparing a coolant, comprising the following steps:
   adding 30 parts to 70 parts of a hydrofluoroether compound into a reactor equipped with a stirring device and maintaining the reactor in room temperature, wherein the hydrofluoroether compound is 1,1,2,2-tetrafluoroethyl-2,2,2-trifluoroethyl ether;
   turning on the stirring device and adding 30 parts to 50 parts of a halogenated hydrocarbon and 1 part to 10 parts of an alcohol compound while stirring, to form a hydrofluoroether azeotrope, the halogenated hydrocarbon being selected from a group consisting of 1,1-dichloroethane and 1,2-dichloroethylene, the alcohol compound being selected from a group consisting of methanol and ethanol;
   adding 0.01 parts to 0.5 parts of an antioxidant and 0.01 parts to 0.5 parts of a preservative into the hydrofluoroether azeotrope in sequence, and stirring;
   adding 0.01 parts to 0.5 parts of a nano metal oxide additive and stirring to prepare the coolant;
   loading the prepared coolant into a plastic bucket, and storing the loaded plastic bucket in a sealed state.

9. The method for preparing the coolant of claim 8, wherein in the step of adding the hydrofluoroether compound into the reactor equipped with the stirring device and maintaining the reactor in the room temperature, the room temperature is around 25° C.

10. The method for preparing the coolant of claim 8, wherein in the step of turning on the stirring device and adding the appropriate proportion of the halogenated hydrocarbon and the alcohol compound while stirring, to form the hydrofluoroether azeotrope, further stirring for about 15 minutes after adding the halogenated hydrocarbon and the alcohol compound.

11. The method for preparing the coolant of claim 8, wherein in the step of adding the antioxidant and the preservative into the hydrofluoroether azeotrope in sequence, and stirring, the stirring time is about 15 minutes.

12. The method for preparing the coolant of claim 8, wherein in the step of adding the nano metal oxide additive and stirring to prepare the coolant, stirring at a speed of 2000 rpm for 30 minutes after adding the nano metal oxide additive.

* * * * *